United States Patent [19]

Bolon et al.

[11] Patent Number: 4,728,697

[45] Date of Patent: Mar. 1, 1988

[54] NOVEL COPOLYAMIDEIMIDES, PREPOLYMERS THEREFOR AND METHOD FOR THEIR PREPARATION

[75] Inventors: Donald A. Bolon, Scotia; Thomas B. Gorczyca, Schenectady, both of N.Y.

[73] Assignee: General Electric Company, Schenectady, N.Y.

[21] Appl. No.: 780,853

[22] Filed: Sep. 27, 1985

[51] Int. Cl.$^4$ ............................................. C08G 73/14
[52] U.S. Cl. ...................................... 525/424; 528/26; 528/73; 528/80; 528/84; 528/125; 528/126; 528/128; 528/172; 528/185; 528/188; 528/189; 528/352; 528/353; 525/428; 525/432; 525/436
[58] Field of Search .................... 525/432, 428, 436; 528/353, 352, 26, 128, 125, 126, 172, 185, 188, 189, 73, 80, 84

[56] References Cited

U.S. PATENT DOCUMENTS 4,433,131  2/1984  Bolon et al. ........................ 528/185
4,481,339  11/1984  Bolon ................................. 525/424

*Primary Examiner*—Morton Foelak
*Assistant Examiner*—M. L. Moore
*Attorney, Agent, or Firm*—William H. Pittman; James C. Davis, Jr.; James Magee, Jr.

[57] ABSTRACT

Carboxy-terminated prepolymers are prepared by the reaction of a diamine, preferably an aromatic diamine, or a mixture thereof with a triamine, with a carboxy anhydride such as trimellitic anhydride and a dianhydride such as bisphenol A dianhydride. The prepolymers, or functional derivatives thereof, are then reacted with a diisocyanate or diamine, or a mixture thereof with a triisocyanate or triamine, preferably an aromatic diisocyanate, to produce copolyamideimides. The products prepared using triamines or triisocyanates are crosslinked. Other products containing alkyl or alicyclic groups attached to aromatic radicals can be oxidatively crosslinked, e.g., by heating in air.

16 Claims, No Drawings

NOVEL COPOLYAMIDEIMIDES, PREPOLYMERS THEREFOR AND METHOD FOR THEIR PREPARATION

This application is related to copending application Ser. No. 532,325, filed Sept. 15, 1983, now abandoned. The entire disclosure of said copending application is incorporated by reference herein.

This invention relates to new polymeric compositions of matter and methods for their preparation. In a more particular sense, it relates to copolyamideimides, methods for their preparation and crosslinking, and carboxy-terminated polyimide prepolymer intermediates for the preparation thereof, as more fully defined hereinafter.

Various polyamides and polyimides prepared by the reaction of polycarboxylic acids and their functional derivatives with polyamides and/or polyisocyanates are known in the art. For example, British published application No. 2,080,316 discloses the reaction of a mixture of one or more dianhydrides and a tribasic acid anhydride with a diamine, diisocyanate or mixture thereof to produce polymers containing both amide and imide linkages. Other reactions of diamines with polycarboxylic acid anhydrides are disclosed in U.S. Pat. No. 3,975,345. The reaction of diisocyanates with various combinations of dicarboxylic, tricarboxylic and tetracarboxylic acids and their anhydrides are disclosed in the following U.S. Pat. Nos.

3,843,587
3,929,691
4,061,622.

According to U.S. Pat. No. 4,331,799, polymers containing both amide and imide moieties can be prepared by reacting diamines with a mixture of a dianhydride and the acyl chloride of a carboxy anhydride, such as trimellitic anhydride.

This reaction and the others disclosed as described above produce polymers of random and relatively uncontrollable structure and properties. Among the results may be high susceptibility to heat distortion and low glass transition temperature. Moreover, the use of an acyl chloride as a precursor may result in the presence of residual chloride in the polymer, an unacceptable situation for certain utilities (for example as electrical insulators).

A principal object of the present invention, therefore, is to provide novel copolyamideimides and intermediates therefor.

A further object is to provide copolyamideimides with relatively high glass transition temperatures and resistance to heat distortion.

A further object is to provide relatively simple methods for the preparation of such copolyamideimides.

A still further object is to provide novel prepolymers capable of conversion into such copolyamideimides.

A still further object in to provide crosslinkable copolyamideimides, a method for crosslinking the same, and crosslinked products prepared therefrom.

Other objects will in part be obvious and will in part appear hereinafter.

The present invention has three major aspects, one relating to carboxy-terminated polyimide prepolymers, another to crosslinkage copolyamideimides prepared therefrom and a third to crosslinked products. The prepolymers are prepared by a method which comprises reacting, under conditions whereby all water of reaction is removed:

(A) at least one polyamine having the formula $$H_2N-R^1-NH_2, \quad (I)$$

wherein $R^1$ is a hydrocarbon-based radical, with (B) at least one carboxy anhydride having the formula

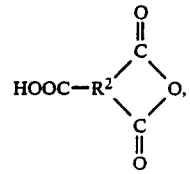

$$(II)$$

wherein $R^2$ is a trivalent hydrocarbon-based radical, and (C) at least one dianhydride having the formula

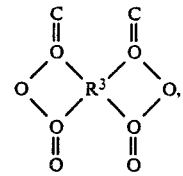

$$(III)$$

wherein $R^3$ is a tetravalent hydrocarbon-based radical; the molar ratio of reagent C to reagent B being at least about 0.25:1 and the ratio of the equivalents of reagent A to anhydride equivalents of reagents B and C combined being about 1:1.

The copolyamideimides are prepared by reacting (D) said prepolymer or a mixture thereof with at least one dicarboxylic acid having the formula $$HOOC-R^7-COOH, \quad (IV)$$

wherein $R^7$ is a divalent hydrocarbon-based radical containing about 3–12 carbon atoms, or a functional derivatives thereof, with (E) at least one of polyisocyanates having the formula $$OCN-R^4-NCO \quad (V)$$

and polyamines having the formula $$R^5NH-R^4-NHR^6, \quad (VI)$$

wherein $R^4$ is a divalent hydrocarbon-based or polymeric radical and each of $R^5$ and $R^6$ is independently hydrogen or a lower hydrocarbon-based radical.

As used herein, the term "hydrocarbon-based radical" denotes a radical free from acetylenic and usually also from ethylenic unsaturation, having a carbon atom directly attached to the remainder of the molecule and having predominantly hydrocarbon character within the context of this invention. Such radicals include the following:

(1) Hydrocarbon radicals; that is, aliphatic, alicyclic, aromatic, aliphatic- and alicyclic-substituted aromatic, aromatic-substituted aliphatic and alicyclic radicals, and the like. Such radicals are known to those skilled in the art; examples are methyl, ethyl, propyl, butyl, decyl, cyclopentyl, cyclohexyl, phenyl, tolyl, xylyl, α-naphthyl, β-naphthyl and biphenylyl (all isomers being included).

(2) Substituted hydrocarbon radicals; that is, radicals containing non-hydrocarbon substituents which, in the context of this invention, do not alter the predominantly hydrocarbon character of the radical. Those skilled in the art will be aware of suitable substituents; examples are halo, alkoxy (especially lower alkoxy), carbalkoxy, nitro, cyano and alkyl sulfone.

(3) Hetero radicals; that is, radicals which, while predominantly hydrocarbon in character within the context of this invention, contain atoms other than carbon present in a chain or ring otherwise composed of carbon atoms. Suitable hetero atoms will be apparent to those skilled in the art and include, for example, nitrogen, oxygen, sulfur and silicon.

For the most part, not more than three substituents or hetero atoms will be present for each 10 carbon atoms in the hydrocarbon-based radical. An exception comprises molecules in which silicon is a hereto atom, which may, for example, contain three hetero atoms for as few as 4 carbon atoms.

Reagent A according to this invention is at least one polyamine having formula I, which is usually a diamine or triamine. The $R^1$ value therein is most often an aromatic hydrocarbon or amino-substituted aromatic hydrocarbon radical containing about 6-20 carbon atoms or a halogenated derivative thereof, an alkylene, cycloalkylene or amino-substituted alkylene or cycloalkylene radical containing about 2-20 carbon atoms, or a bis-alkylenepoly(dialkylsiloxane) radical. The hydrocarbon radicals, especially aromatic hydrocarbon radicals, are preferred.

Examples of suitable diamines of formula I are ethylenediamine, propylenediamine, trimethylenediamine, diethylenetriamine, triethylenetetramine, heptamethylenediamine, octamethylenediamine, 2,11-dodecanediamine, 1,12-octadecanediamine, 3-methylheptamethylenediamine, 4,4-dimethylheptamethylenediamine, 5-methylnonamethylenediamine, 2,5-dimethylhexamethylenediamine, 2,2-dimethylpropylenediamine, N-methyl-bis(3-aminopropyl)amine, 3-methoxyhexamethylenediamine, 1,2-bis(3-aminopropoxy)ethane, bis(3-aminopropyl) sulfide 1,4-cyclohexanediamine, bis(4-aminocyclohexyl)methane, m-phenylenediamine, p-phenylenediamine, 2,4-diaminotoluene, 2,6-diaminotoluene, m-xylylenediamine, p-xylylenediamine, benzidine 3,3'-dimethylbenzidine, 3,3'-dimethoxybenzidine, 1,6-diaminonaphthalene, 4,4'-diaminodiphenylmethane, 4,4'-diaminodiphenylpropane, 2,4-bis-(β-amino-t-butyl)toluene, bis(p-β-methyl-o-aminopentyl)-benzene, 1,3-diaminodiphenyl ether and bis(3-aminopropyl) tetramethyldisiloxane. Mixtures of these diamines, as well as functional derivatives analogous to those described hereinafter with reference to triamines, may also be used. Particularly preferred are the aromatic diamines, especially m-phenylenediamine, m-toluenediamine and 4,4'-diaminodiphenylmethane; the $R^1$ radical then has one of the following formulas

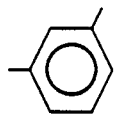

(VII)

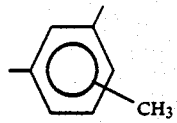

(VIII)

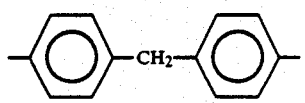

(IX)

and preferably formula VII.

It is also within the scope of the invention for reagent A to include at least one triamine, i.e., at least one compound in which $R^1$ is an amino-substituted radical. Illustrative triamines are 2,4-bis(p-aminobenzyl)aniline, melamine, tris(2-aminoethyl) cyanurate, tris(2-aminoethyl) isocyanurate and tris(3-amino-4-methylphenyl) isocyanurate. Also useful are functional derivatives of triamines, illustrated by the product sold by Mobay Chemical Company under the trademark "Mondur SH", the principal active ingredient of which is the tris(phenyl carbamate) derivative of tris(3-amino-4-methylphenyl) isocyanurate. When present, the triamine may comprise up to about 60% by weight, preferably about 1-40% of reagent A. The use of triamines produces crosslinked prepolymers, which may be converted to crosslinked polyamideimides by the methods described hereinafter.

In reagent B (the carboxy anhydride) as defined by formula II, $R^2$ is usually a trivalent aliphatic radical containing about 2-20 carbon atoms or, preferably, a trivalent aromatic radical containing about 6-20 carbon atoms. Illustrative carboxy anhydrides are trimellitic anhydride, 5-chlorotrimellitic anhydride, benzene-1,2,3-tricarboxylic acid anhydride and carboxysuccinic anhydride. The preferred carboxy anhydrides are those in which $R^2$ is an aromatic and especially an aromatic hydrocarbon radical. Trimellitic anhydride, in which $R^2$ has the formula

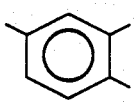

(X)

is most preferred.

In reagent C (the dianhydride) as defined by formula III, $R^3$ is a tetravalent radical which is typically analogous to those previously described with reference to $R^1$ and $R^2$. A number of suitable dianhydrides are disclosed in columns 5-6 of U.S. Pat. No. 4,061,622 and in U.S. Pat. No. 4,331,799. The disclosures of both of said patents are incorporated by reference herein.

A particularly preferred group of dianhydrides of formula III comprises those in which R3 has the formula

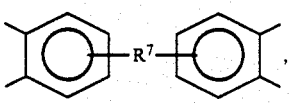

(XI)

wherein $R^7$ is oxygen, sulfur, $-SO_2-$, lower alkylene (i.e., alkylene of up to 7 carbon atoms) or, most desirably, $-O-R^8-O-$ and $R^8$ is a divalent aromatic hydrocarbon-based radical. $R^8$ is most often a divalent radical derived from benzene or a substituted benzene, biphenyl or a substituted biphenyl, or a diphenylalkane which may contain substituents on one or both aromatic radicals. The radicals preferred as $R^8$ are those of the formulas

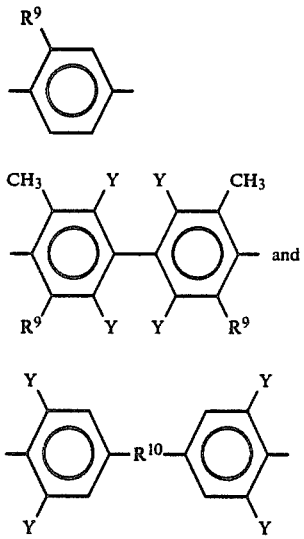

wherein each $R^9$ is independently hydrogen or methyl, $R^{10}$ is a straight-chain or branched alkylene radical containing 1–5 carbon atoms and is most often the isopropylidene radical, and each Y is independently hydrogen or halogen (usually chlorine or bromine). Mixtures of the foregoing formulas are also contemplated. Most preferred is the radical derived from bisphenol A [i.e., 2,2′-bis(4-hydroxyphenyl)propane] by the removal of both hydroxy groups therefrom, and having the formula

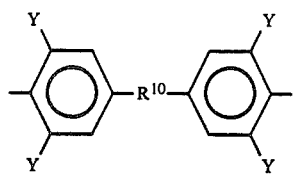

wherein $R^{10}$ is isopropylidene and each Y is hydrogen. Thus, the most preferred dianhydride for use as reagent C is 2,2-bis[4-(3,4-dicarboxyphenoxy)phenyl]propane dianhydride, hereinafter referred to as "bisphenol A dianhydride", wherein $R^3$ has the formula

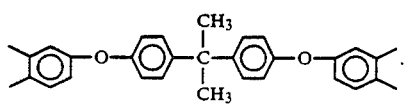

The reaction producing the prepolymers of this invention is ordinarily effected by merely blending reagents A, B and C and heating to a temperature at which said reaction takes place. The reaction with the two anhydrides may be simultaneous (i.e., reagents B and C used together) or sequential (i.e., reagent C added first, followed by reagent B); however, simultaneous reaction is usually preferred since no particular advantage results from sequential addition.

The reaction temperature is typically within the range of about 100°–200° C., and at least partially above about 160° C. to insure removal of all water of reaction and complete imidization of any amic acids formed. It is usually advantageous to carry out the reaction in a substantially inert organic diluent. Typical diluents are such aprotic solvents as benzene, toluene, xylene, o-dichlorobenzene, dimethylformamide, dimethylacetamide, dimethyl sulfoxide or N-methylpyrrolidone.

A factor in the formation of the prepolymer is the difference in reactivity with reagent A of intramolecular anhydride and carboxylic acid moieties. The reaction of a diamine with intramolecular anhydride moieties is strongly favored over that with carboxylic acid moieties. This selectivity insures production of a carboxy-terminated prepolymer.

It is frequently preferred to include in the reaction mixture a catalytic amount of at least one tertiary amine, which may be aliphatic, alicyclic or heterocyclic. Suitable amines include triethylamine, N-methylpiperidine and 4-dimethylaminopyridine. The required amount of tertiary amine is small, typically about 0.05–0.5% by weight based on the total of reagents A, B and C.

The molecular weight of the prepolymer intermediate will depend to a large extent on the molecular ratio of reagent C to reagent B in the reaction mixture, with higher molecular weight prepolymers being obtained as the proportion of reagent C is increased. Molar ratios of at least about 0.25:1 are within the scope of the invention. A ratio of at least 0.5:1 is preferred, since lower ratios will produce a prepolymer in which some molecular species contain moieties derived from reagents A and B only. There does not appear to be any upper limit to this molar ratio, although a higher value than about 5:1 usually affords no particular advantage.

The proportion of reagent A in the reaction mixture is determined so as to produce a carboxy-terminated prepolymer. This is effected by using a ratio of equivalents of reagent A to anhydride equivalents of reagents B and C combined of about 1:1, typically about 0.95–1.05:1. The term "anhydride equivalent" as used herein is based on the number of anhydride groups theoretically present per molecule, with free carboxylic acid groups being disregarded; thus, one mole of reagents B and C is one and two anhydride equivalents, respectively. One mole of reagent A is the number of equivalents corresponding to the number of amino groups present per molecule. Under these conditions, only the anhydride groups react with reagent A and the free carboxy groups become the terminal groups in the prepolymer.

Structural evidence indicates that the prepolymers of this invention wherein reagent A is entirely diamine have the formula

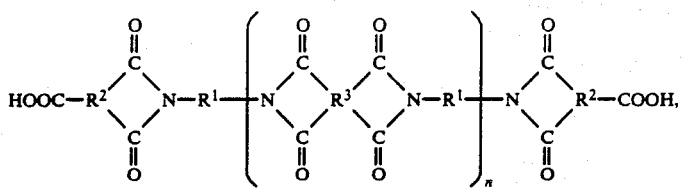

(XVI)

wherein $R^{1-3}$ are as previously defined. In that formula, the value of n will theoretically be twice the molar ratio of component C to component B. As said molar ratio varies from 0.25:1 to 5:1, therefore, the average value of n will vary from 0.5 to 10 and is preferably at least 1. Prepolymers having formula XVI are an embodiment of the invention, as are the corresponding crosslinked prepolymers obtained when reagent A also comprises at least one triamine.

The preparation of the prepolymers of the invention is illustrated by the following examples. All parts are by weight.

EXAMPLES 1-6

A mixture of 19.2 grams (0.1 mole) of trimellitic anhydride (reagent B), bisphenol A dianhydride (reagent C), a stoichiometric amount of m-phenylenediamine (MPD) or 4,4'-diaminodiphenylmethane (MDA) (reagent A) with respect to anhydride equivalents of reagents B and C, 0.01 part of 4-dimethylaminopyridine, 30 parts of N-methylpyrrolidone and 47 parts of toluene was slowly heated to 130° C., during which time the mixture become homogeneous and a toluene-water azeotrope began to distill. Heating was continued to approximately 180° C. as water was removed by distillation. The residue was a solution of the desired prepolymer.

The reagents, proportions and other pertinent data for Examples 1-6 are given in Table I.

TABLE I

| Example | Amine | Mole ratio, C:B |
|---|---|---|
| 1 | MPD | 0.5 |
| 2 | MPD | 0.25 |
| 3 | MPD | 1.0 |
| 4 | MDA | 0.5 |
| 5 | MDA | 1.0 |
| 6 | MDA | 1.5 |

For the formation of the polyamideimides of the invention, the prepolymer or a functional derivative thereof (reagent D) is reacted with reagent E which may be a polyisocyanate or a polyamine. If reagent D is the prepolymer itself, the reaction forming the polyamideimide proceeds most effectively when reagent E is a polyisocyanate, and involves the condensation of one carboxylic acid moiety with one isocyanate moiety to form an amide linkage with the elimination of one mole of carbon dioxide. A corresponding carboxylic acid-amine reaction is somewhat slow and difficult, so if reagent E is a polyamine it is preferred to use as reagent D a functional derivative of the prepolymer such as an acyl halide thereof. For electrical uses of the polyamideimides, however, where the presence of halide ions may be detrimental, and also for the sake of simplicity of production, the reaction between the prepolymer and the polyisocyanate is preferred. Frequent reference hereinafter will be made to polyisocyanates as reagent E, but it should be understood that polyamines may be substituted therefor under appropriate conditions.

It is also within the scope of the invention for reagent D to be a mixture of the prepolymer or functional derivative thereof with at least one dicarboxylic acid having formula IV, or a functional derivative thereof. Whether the free acid or a derivative thereof is used will depend on the structure of the prepolymer, the same functional groups being present in both. The R7 value in formula IV is a divalent hydrocarbon-based radical containing about 3-12 carbon atoms such as trimethylene, tetramethylene, hexamethylene, decamethylene, m-phenylene, p-phenylene, p-tolylene, p-chlorophenylene or 1,4-naphthylene. Alkylene radicals containing 3-6 carbon atoms and aromatic hydrocarbon radicals, especially the latter, are preferred. Most preferably, $R^7$ is at least one of the m- and p-phenylene radicals.

In general, molar ratios of dicarboxylic acid (if present) to prepolymer in reagent D may be as high as 2:1 but are preferably up to about 1.5:1. There is no real lower limit for said ratio, but a value less than about 0.1:1 rarely offers any advantage. The most preferred values are from about 0.4:1 to about 1.25:1.

The polyisocyanates and polyamines suitable for use as reagent E have formulas V and VI, respectively and are usually di- or triisocyanates or di- or triamines. The $R^4$ value may be a divalent hydrocarbon radical or amino- or isocyanato-substituted hydrocarbon radical similar to $R^1$ in formula I. It may be the same as $R^1$ or different. When reagent E is an amine, each of $R^5$ and $R^6$ may be hydrogen or a lower hydrocarbon-based radical, preferably a hydrocarbon radical and still more preferably a lower alkyl (especially methyl). When $R^5$ and $R^6$ is other than hydrogen, the reaction thereof with the acid moiety in the prepolymer will form an N-substituted amide linkage. Such linkages are, of course, not formed when reagent E is an isocyanate.

Illustrative diamines suitable for use as reagent E include those recited hereinabove with reference to reagent A, as well as, for example, the corresponding N,N'-dimethyl compounds. Illustrative diisocyanates are p-phenylene diisocyanate, 2,4-toluene diisocyanate (2,4-TDI), 2,6-toluene diisocyanate (2,6-TDI), xylene diisocyanates, mesitylene diisocyanate, durene diisocyanate, 4-methyloxy-1,3-phenylene diisocyanate, 4-chloro-1,3-phenylene diisocyanate, 4-isopropyl-1,3-phenylene diisocyanate, the tolidine diisocyanates, dianisidine diisocyanate, 4,4'-methylenebis(phenyl isocyanate) (MDI), 4,4-methylenebis(o-tolyl isocyanate), 4,4'-methylenebis(cyclohexyl isocyanate), 1,5-naphthalene diisocyanate, 4,4'-bis(isocyanatophenyl) ether, 2,4'bis-(isocyanatophenyl) ether, and 4,4'-bis(isocyanatophenyl) sulfone. Mixtures of the foregoing isocyanates are also contemplated. Also useful are functional derivatives analogous to those described hereinafter with reference to triisocyanates and triamines. The preferred diisocyanates, from the standpoint of availability, low cost and particular suitability for preparing the cross-linkage polyamideimides of this invention, are MDI, 2,4-TDI and 2,6-TDI, the latter two being most preferred.

When triamines or triisocyanates are present in reagent E, they generally comprise up to about 60% by weight and preferably about 1-40% thereof. Functional derivatives of such compounds, such as the hereinabove-identified "Mondur SH", may also be used. The use of such triisocyanates or triamines produces crosslinked polymers. In general, triamines or triisocyanates will be present, if at all, in only one of reagents A and E.

Reagent E may also be an isocyanate- or amine-terminated polymer, such as a polyamide or polyurethane. In that case, $R^4$ is a polymeric radical and the product is a block copolymer with polyimide and polyamide, polyurethane or similar blocks connected by amide linkages.

For the preparation of the copolyamideimides, a mixture of reagents D and E is normally heated to a temperature within the range of about 150°-225° C. until carbon dioxide evolution is complete. The reaction may be effected in a substantially inert organic diluent such as those previously listed with reference to prepolymer formation; the preferred diluents for polymer formation are the dipolar aprotic solvents such as dimethylformamide, dimethylacetamide, dimethyl sulfoxide and N-methylpyrrolidone.

The ratio of equivalents of reagents D to reagent E (the equivalent weight of each being half its molecular weight when reagent D is entirely diamine, and that of reagent D being proportionally less when reagent D is partly triamine) may be varied in accordance with the polymer molecular weight desired. In general, ratios between about 0.5:1 and about 2:1 are contemplated, these being the minimum and maximum values which will produce a product containing at least two prepolymer- or diisocyanate-derived units. Ratios from about 0.67:1 to about 1.5:1 are preferred since products of higher molecular weight are then obtained. The most preferred ratio is about 1:1. Because the reaction between reagents D and E normally does not proceed to completion, it is frequently advisable to analyze the reaction mixture for free acid groups after the initial reaction with reagent E, and subsequenlty to add an additional increment thereof effective to reduce the residual acid content to less than about 1%. Most often, no more than about 10% by weight of the original amount of reagent E is required for this purpose. Thus, a ratio of equivalents of reagent D to reagent E between about 0.9:1 and about 1:1 is especially preferred. It is also contemplated to incorporate in the reaction mixture minor amounts of chain-stopping or end-capping reagents, typically monoisocyanates such as phenyl isocyanate, monoamines such as aniline, monocarboxylic acids such as benzoic acid or monoanhydrides such as phthalic anhydride.

It is believed that the copolyamideimides of this invention wherein reagent A consists essentially of diamine are characterized by structural units having the formula

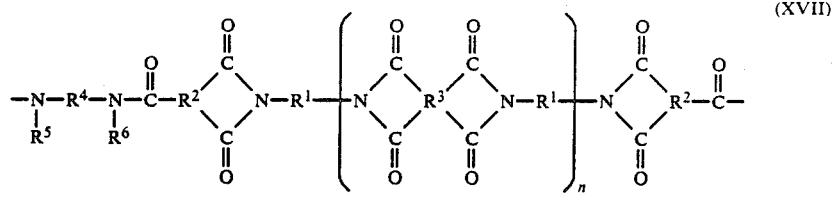

(XVII)

and, if a dicarboxylic acid is employed in reagent D, the formula

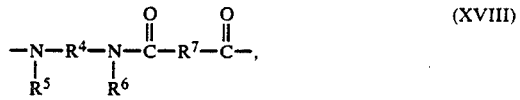

(XVIII)

wherein $R^{1-7}$ and n are as previously defined. Because of some uncertainty regarding this structure, however, they are also appropriately defined in terms of the method for their preparation.

The copolyamideimides of this invention normally have weight average molecular weights from about 30,000 to about 150,000. The intrinsic viscosities thereof, determined in dimethylformamide at 25° C., are in the range of about 0.2-0.9 dl./g.

The preparation of the copolyamideimides of this invention is illustrated by the following examples.

EXAMPLE 7

A mixture of equivalent amounts of the prepolymer solution of Example 1 and 2,4-TDI was prepared at room temperature and heated slowly to about 180° C. over 3 hours, during which time vigorous carbon dioxide evolution occurred. The viscosity of the solution increased markedly during this period. The solution was cooled, dissolved in dimethylformamide and precipitated by pouring into methanol. The copolyamideimide was removed by filtration and dried in a vacuum oven; it had an intrinsic viscosity of 0.33 dl./g. and a glass transition temperature of 265° C.

EXAMPLES 8-17

To 0.1 equivalent of each of the prepolymers of Examples 1-6 was added slowly, at 150°-190° C., a solution of 0.1 equivalent of diisocyanate in 50 ml. of -dichlorobenzene. After carbon dioxide evolution was complete, the mixture was titrated to determine the presence of free acid and the additional amount of diisocyanate calculated to neutralize the free acid was added. The polymer was then precipitated and dried in accordance with Example 7.

The compositional details and properties of the products of Examples 8-17 are given in Table II. All percentages are by weight. Heat distortion temperatures (HDT) were determined by ATM procedure D648, and weight average molecular weights by gel permeation chromatography.

TABLE II

| Example | Prepolymer of Example | Diisocyanate | Intrinsic visc., dl./g. | Tg, °C. | HDT, °C. | Mw |
|---|---|---|---|---|---|---|
| 8 | 1 | 2,4-TDI | 0.45 | 265 | — | — |
| 9 | 1 | 65% 2,4-TDI 35% 2,6-TDI | 0.43 | 262 | — | — |
| 10 | 1 | MDI | 0.30 | 245 | — | 65,000 |
| 11 | 2 | 2,4-TDI | 0.46 | 275 | — | — |
| 12 | 3 | 2,4-TDI | 0.44 | 248 | 215 | — |
| 13 | 3 | MDI | 0.22 | 229 | — | 70,000 |
| 14 | 4 | 2,4-TDI | 0.47 | 254 | — | 52,000 |
| 15 | 4 | MDI | 0.79 | 244 | — | 127,000 |
| 16 | 5 | 2,4-TDI | 0.34 | 230 | — | 72,000 |
| 17 | 6 | 2,4-TDI | 0.44 | 225 | — | 83,000 |

EXAMPLES 18-20

To 0.1 equivalent of the prepolymer of Example 1 was added a measured amount of dicarboxylic acid. After all toluene was removed by distillation, the temperature of the mixture raised to 150°-190° C. and a solution of a equivalent amount of 2,4-TDI in 50 ml. of o-dichlorobenzene was added over 1 hour. After carbon dioxide evolution was complete, the mixture was titrated to determine the presence of free acid and the additional amount of diisocyanate calculated to neutralize the free acid was added. The solution was cooled, dissolved in dimethylformamide and precipitated by pouring into methanol. The copolyamideimide was removed by filtration and dried in a vacuum oven.

The compositional details and properties of the products of Examples 18-20 are given in Table III. Intrinsic viscosities were determined in dimethylformamide at 25° C.

TABLE III

| Example | 18 | 19 | 20 |
|---|---|---|---|
| Dicarboxylic acid | Adipic | Isophthalic | Isophthalic |
| Molar ratio, acid: prepolymer | 1:1 | 1:1 | 0.5:1 |
| Intrinsic viscosity, dl./g. | 0.28 | 0.31 | 0.24 |
| Tg, °C. | 228 | 254 | 255 |

The copolyamideimides of this invention may be converted into films for wrapping and packaging applications and into molding compounds. They are also useful for application solution to electrical conductors made of copper, aluminum or the like, particularly wires, as insulating coatings. If desired, additional overcoats of polyamides, polyesters, silicones, polyvinyl formals, epoxy resins, polyimides, polytetrafluoroethylene or the like may be further applied to such insulated conductors.

In certain areas of use, such as for insulating magnet wire to be used in motors, transformers and the like, high thermal stability is desirable because these devices frequently function at temperatures greater than the creep point of prior art thermoplastic coatings, thereby causing such coatings to deteriorate, possibly resulting in the failure of the electrical devices. Therefore, another aspect of the invention is crosslinked polyamideimides having high thermal stability.

One embodiment of this aspect of the invention is the previously described crosslinked materials obtained by incorporating a triamine or functional derivative thereof in reagent A or a triamine, triisocyanate or functional derivative thereof in reagent E. Another embodiment of particular interest is of use when reagent A is entirely diamine and when the copolyamideimide comprises structural units containing at least one aromatic radical having at least one alkyl or alicyclic substituent. Such copolyamideimides are crosslinked by a method which comprises contacting said copolyamideimide with an oxidizing agent and heating said copolyamideimide at a temperature within the range from its glass transition temperature (Tg) to just below its degradation temperature.

The crosslinkable structural units may be derived from diamines such as diaminotoluenes, from diisocyanates such as TDI, or from alkyl- or alicyclic-substituted dianhydrides or carboxy anhydrides. The alkyl or alicyclic groups attached to an aromatic group act as functional sites for the oxidative crosslinking reaction of the polymer.

Examples of suitable alkyl or alicyclic substituents attached to any of the aromatic radicals include methyl, ethyl, propyl, pentyl, isopropyl, isobutyl, cyclohexyl, and the like. The substituents may have a wide variety of organic and inorganic substituents attached thereto, such as halogen, nitrile, carboxylic acid, carbonyl, sulfur-containing groups and the like. It is preferred that the substituent have up to about 6 carbon atoms, and especially that it be a methyl group since in certain instances, methyl groups allow faster oxidative crosslinking than other substituents. Alkyl or alicyclic substituents containing longer carbon chains may rqurie a greater amount of time in achieving crosslinking, although higher crosslinking temperatures may be used to reduce the amount of time needed for crosslinking in those instances.

The presence of the alkyl or alicyclic substituent enables the polymer to be oxidatively crosslinked. It appears that the exposure of the polymer to the oxidizing conditions described herein causes oxidation of at least some of the alkyl or alicyclic substituents to form aldehyde-type groups which condense with free amine functionalities to yield imine groups which from the crosslinking linkages in the polymer. If the polymer is not contacted with an oxidizing agent either at a temperature below its Tg or at a temperature within the range from its Tg to just below its degradation temperature, the polymer remains thermally stable and will not undergo oxidative crosslinking.

The copolyamideimide in its uncrosslinked state can be extruded directly onto metallic electrical conductors, such as magnet wire, to produce articles which are another aspect of the invention. If crosslinking is accomplished by incorporating a triamine or triisocyanate in reagent E, therefore, it is necessary to interrupt copolyamideimide formation and extrude the polymer onto the conductor before substantial crosslinking occurs as evidenced, for example, by gel formation. On the other hand, oxidatively crosslinkable copolyamideimides may be fully polymerized before and crosslinked after extrusion.

Extrusion techniques for this type of coating application are well known in the art and need not be described in detail. Typically, the solid polymer is fed into an extruder or injection molding apparatus euipped with a heater. As the polymer is heated to approximately its softening point, it flows through the molding apparatus onto a conductor, e.g., copper wire, which is passing through or adjacent the apparatus at an angle perpendicular to the polymer stream. By this method, the entire surface of the wire is coated, and as the conductor leaves the molding apparatus, the polymer cools and adheres to the wire. The amount of air containing the polymer during extrusion is generally not sufficient to induce premature oxidative crosslinking. If desired, though, nitrogen or other inert gas blanket may be situated in the vicinity of the extruder barrel to prevent the entry of air.

When the oxidatively crosslinkable copolyamideimides are used as wire coating materials as discussed above, the coated wire may be passed through a conventional convection oven or wire tower having an oxidizing agent therein, such as air. Crosslinking temperatures may range from the Tg of the polymer to just below its degradation temperature. Typical crosslinking temperatures corresponding to this range are about 225°–325° C., with the preferred range being about 275°–320° C. Higher temperatures result in faster crosslinking of the polymer, although increased oven exposure times can compensate for lower exposure temperatures. The length of time for which the polymers may be exposed to the crosslinking environment may vary widely, depending on film thickness, oven temperature, and the number of alkyl or alicyclic substituents attached to the polymer. Although the entire polymer may undergo crosslinking if desired, the crosslinking of only the surface region of the polymer may be adequate for excellent solvent resistance in a wire coating. Typically, the coatings require less than about 60 minutes for crosslinking in the surface region to occur upon contact with oxygen or air when oven temperatures are approximately 320° C. The surface region as broadly defined may be about several tenths of a mil deep in a cured polymer coating having a thickness of about 1.0 mil. It is also possible to delay the oxidative crosslinking step, if desired, for several hours or even several months.

In the preferred crosslinking method, the polymer is contacted with oxygen or air, preferably the latter, at the same time it is being heated within the crosslinking temperature range, regardless of whether the polymer is contacted with an oxidizing agent prior to that time. Alternatively, an article may be coated with the uncrosslinked polymer and then contacted with an oxidizing agent such as potassium permanganate at room temperature or at any desired temperature below the Tg of the uncrosslinked polymer, if desired. The polymer may then be heated by an suitable heat source in an air or inert atmosphere, or in a vacuum, at a temperature from its Tg to just below its degradation temperature to effect crosslinking in at least the surface region of the polymer. If, in this alternative method, crosslinking of the entire polymer is desired, it may be necessary to utilize only an air atmosphere while heating the polymer within the crosslinking temperature range.

The polymer in its uncrosslinked state may also be solvent-deposited by standard techniques onto electrical wire prior to oxidatively crosslinking the polymer. Typically, the polymer is dissolved in a suitable chlorinated solvent, such as o-dichlorobenzene. The solution is then applied to wire in repeat passes through a standard wire tower apparatus to form a coating thereon. As the coating is heated in oxygen or air within the temperature range discussed above, the solvent evaporates and oxidative crosslinking occurs. An insulative coating formed by this process has the same improved physical properties as the extruded coating discussed above. As still another alternative, the wire may be drawn through the molten polymer under a nitrogen blanket. The coating on the wire is then oxidatively crosslinked, as discussed above.

When the crosslinked polymer of the present invention is present on a metal conductor, it serves as an insulating coating having a high degree of solvent resistance and thermal stability. The improved properties are due in part to an increase in the Tg of the polymer after crosslinking has occurred. Thus, there is a decreased probability that wires coated by the above process will become short-circuited when accidentally crossed and chafed in a high-temperature environment.

The preparation of crosslinked copolyamideimides of this invention is illustrated by the following examples.

EXAMPLE 21

A copolyamideimide is prepared by the method of Example 11 except for the following variations. The 2,4-TDI is replaced on an equal weight basis with a 5:1 (by weight) mixture of 2,4-TDI and "Mondur SH". The heating of the reaction mixture is stopped before crosslinking (as evidenced by gel formation) has occurred, and a hydrocarbon solvent is added to aid flowability. The solution thus prepared is coated on copper wire in a laboratory wire tower 15 feet long, heated from 250° C. at the bottom to 400° C. at the top. The enamel is applied to the wire with split dies in four applications, at a wire passage rate of 11–17 feet per minute. During the passage of the wire through the tower, the enamel cures to form a solid, crosslinked insulating coating.

EXAMPLES 22-23

The copolyamideimides of Examples 8 and 12 were pressed into plaques by heating the polymer powder on aluminum foil at 270°–290° C. for 1½ minutes on the platens of a laboratory press at 500 psi. The resulting plaques, 15–50 mils thick, were cut into test samples which were heated in air at 225° C., with samples periodically taken and tested for solubility in dimethylformamide. Both polymers had crosslinked within 4 hours, as evidenced by insolubility after that time. They could be utilized as wire enamels, using the procedure of Example 21 with suitable modification.

What is claimed is:

1. A method for preparing a crosslinked polymer which comprises the steps of:
   (1) preparing a carboxy-terminated prepolymer by reacting, under conditions whereby all water of reaction is removed:
   (A) at least one polyamine having the formula

   $$H_2N-R^1-NH_2, \qquad (I)$$

wherein $R^1$ is a divalent aromatic hydrocarbon radical containing about 6–20 carbon atoms or halogenated derivative thereof, alkylene or cycloalkylene radical containing about 2–20 carbon atoms, or bis-alkylenepoly(dialkylsiloxane) radical; with
   (B) at least one carboxy anhydride having the formula

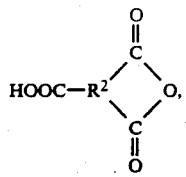

(II)

wherein $R^2$ is a trivalent aliphatic radical containing about 2–20 carbon atoms or aromatic radical containing about 6–20 carbon atoms, and
(C) at least one dianhydride having the formula

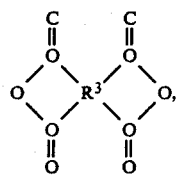

(III)

wherein $R^3$ is a tetravalent aliphatic radical containing about 2–20 carbon atoms or aromatic radical containing about 6–20 carbon atoms;
  the molar ratio of reagent C to reagent B being at least about 0.25:1 and the ratio of equivalents of reagent A to anhydride equivalents of reagents B and C combined being about 1:1;
(2) preparing a copolyamideimide by reacting, at a temperature within the range of about 150°–225° C.,
  (D) said carboxy-terminated prepolymer with (E) at least one compound selected from the group consisting of polyisocyanates having the formula

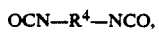    (V)

polyamines having the formula

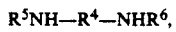    (VI)

and functional derivatives thereof, wherein:
  $R^4$ is a divalent polymeric radical, aromatic hydrocarbon radical containing about 6–20 carbon atoms or halogenated derivative thereof, alkylene or cycloalkylene radical containing about 2–20 carbon atoms, or bis-alkylenepoly(dialkylsiloxane) radical; and
  each of $R^5$ and $R^6$ is independently hydrogen or a lower hydrocarbon radical,
the structural units in said copolyamideimide containing at least one aromatic radical having at least one alkyl or alicyclic substituent; and
(3) contacting said copolyamideimide with an oxidizing agent and heating said copolyamideimide at a temperature within the range from its glass transition temperature to just below its degradation temperature.

2. A method according to claim 1, wherein the copolyamideimide is heated with oxygen or air at a temperature within the range of about 225°–325° C.

3. A method according to claim 2, wherein reagent A is at least one diamine; R2 is an aromatic hydrocarbon radical; $R^3$ has formula XI, wherein $R^7$ is oxygen, sulfur, —SO$_2$—, lower alkylene or —O—$R^8$—O—, and $R^8$ is a divalent radical derived from benzene or a substituted benzene, biphenyl or a substituted biphenyl, or a diphenylalkane which optionally contains substituents on one or both aromatic radicals; and wherein the reaction mixture also contains a catalytic amount of at least one tertiary amine.

4. A method according to claim 3, wherein reagent B is trimellitic anhydride, reagent C is bisphenol A dianhydride, and the molar ratio of reagent C to reagent B is at least about 0.1:1.

5. A method according to claim 4, wherein $R^1$ is an aromatic hydrocarbon radical.

6. A method according to claim 5, wherein reagent A is m-phenylenediamine, m-toluenediamine or 4,4'-diaminodiphenylmethane.

7. A method according to claim 3, wherein each of $R^1$ and $R^4$ is an aromatic hydrocarbon radical, reagent D is said prepolymer, reagent E is at least one diisocyanate, $R^2$ has the formula

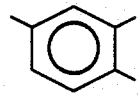    (X)

$R^3$ has the formula

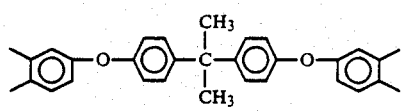    (XV)

and the ratio of equivalents of reagent D to reagent E is from about 0.67:1 to about 1.5:1.

8. A method according to claim 7, wherein reagent E is at least one of 2,4-toluene diisocyanate, 2,6-toluene diisocyanate and 4,4'-methylene bis(phenyl isocyanate).

9. A method for preparing a crosslinked polymer from a copolyamideimide comprising structural units having the formula

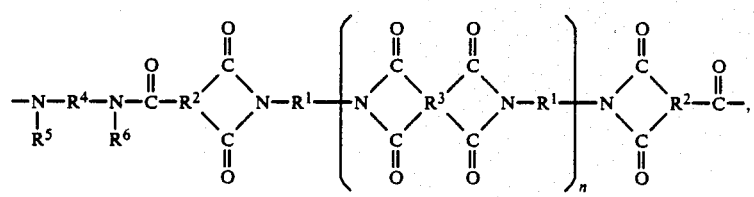    (XVII)

wherein each of $R^1$ and $R^4$ is independently a divalent aromatic hydrocarbon radical containing about 6–20 carbon atoms or halogenated derivative thereof, alkylene or cycloalkylene radical containing about 2–20 carbon atoms, or bis-alkylenepoly(dialkylsiloxane) radical;

$R^2$ is a trivalent aliphatic radical containing about 2–20 carbon atoms or aromatic radical containing about 6–20 carbon atoms;

$R^3$ is a tetravalent aliphatic radical containing about 2–20 carbon atoms or aromatic radical containing about 6–20 carbon atoms;

each of $R^5$ and $R^6$ is independently hydrogen or a hydrocarbon radical; and the average value of n is at least 0.5;

said structural units of formula XVII containing at least one aromatic radical having at least one alkyl or alicyclic substituent;

which comprises contacting said copolyamideimide with an oxidizing agent and heating said copolyamideimide at a temperature within the range from its glass transition temperature to just below its degradation temperature.

10. A method according to claim 8, wherein the copolyamideimide is heated with oxygen or air at a temperature within the range of about 225°–325° C.

11. A method according to claim 10, wherein each of $R^1$ and $R^4$ is an aromatic hydrocarbon radical, $R^2$ has formula X, $R^3$ has the formula

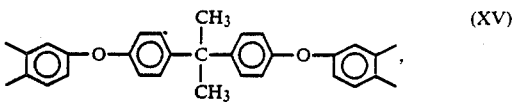

each of $R^5$ and $R^6$ is hydrogen and the average value of n is at least 1.

12. A method according to claim 11, wherein $R^4$ is at least one of the 2,4-tolylene, 2,6-tolylene and 4,4'-methylenebis-phenyl radicals.

13. A crosslinked polymer prepared by the method of claim 2.

14. A crosslinked polymer prepared by the method of claim 10.

15. An article comprising a metallic electrical conductor having on at least a portion thereof an insulating coating comprising a polymer according to claim 13.

16. An article comprising a metallic electrical conductor having on at least a portion thereof an insulating coating comprising a polymer according to claim 14.

* * * * *